US011171677B2

(12) United States Patent
Singh et al.

(10) Patent No.: US 11,171,677 B2
(45) Date of Patent: Nov. 9, 2021

(54) INTERFERENCE CANCELLATION USING CIRCULAR POLARIZED ANTENNAS (71) Applicant: TELCOM VENTURES, LLC, Miami, FL (US)

(72) Inventors: Rajendra Singh, Indian Creek Village, FL (US); George Ronald Olexa, Gainesville, GA (US)

(73) Assignee: TELCOM VENTURES, LLC, Miami, FL (US)

( * ) Notice: Subject to any disclaimer, the term of this patent is extended or adjusted under 35 U.S.C. 154(b) by 0 days.

(21) Appl. No.: 16/966,134

(22) PCT Filed: Apr. 6, 2020

(86) PCT No.: PCT/US2020/026861
§ 371 (c)(1),
(2) Date: Jul. 30, 2020

(87) PCT Pub. No.: WO2020/210154
PCT Pub. Date: Oct. 15, 2020

(65) Prior Publication Data
US 2021/0211149 A1 Jul. 8, 2021

Related U.S. Application Data (60) Provisional application No. 62/831,908, filed on Apr. 10, 2019.

(51) Int. Cl.
*H04B 1/12* (2006.01)
*H01Q 21/24* (2006.01)
(52) U.S. Cl.
CPC ............. *H04B 1/126* (2013.01); *H01Q 21/24* (2013.01)

(58) Field of Classification Search
CPC ................................ H04B 1/126; H01Q 21/24
(Continued)

(56) References Cited

U.S. PATENT DOCUMENTS 5,568,158 A * 10/1996 Gould .................. H01Q 21/245
333/21 A
5,818,517 A * 10/1998 Hudson .............. H04B 7/18513
348/21
(Continued)

FOREIGN PATENT DOCUMENTS

CN 201503919 U 6/2010
KR 10-0360490 B1 10/2002

OTHER PUBLICATIONS

International Search Report and Written Opinion of the International Searching Authority, International Application No. PCT/US2020/026861, dated Jun. 23, 2020, 8 pp.

*Primary Examiner* — Lee Nguyen
(74) *Attorney, Agent, or Firm* — Myers Bigel, P.A.

(57) ABSTRACT

A method for mitigating interference at a receiver may include receiving a communication signal at a first Circular Polarization (CP) antenna as a first received signal, receiving the communication signal at a second CP antenna as a second received signal, phase shifting the second received signal that was received by the second CP antenna to produce a phase shifted signal, and mixing the first received signal that was received by the first CP antenna and the phase shifted signal to produce a resulting received CP signal. Related systems, devices and computer program products are also described.

19 Claims, 7 Drawing Sheets

(58) Field of Classification Search
USPC .......................................... 455/276.1, 278.1
See application file for complete search history.

(56) References Cited

U.S. PATENT DOCUMENTS

| | | |
|---|---|---|
| 6,486,828 B1 | 11/2002 | Cahn et al. |
| 6,653,981 B2 | 11/2003 | Wang et al. |
| 2008/0049672 A1 | 2/2008 | Barak et al. |

* cited by examiner

INTERFERENCE CANCELLATION USING CIRCULAR POLARIZED ANTENNAS

CROSS-REFERENCE TO RELATED APPLICATIONS

The present application is a 35 U.S.C. § 371 national stage application of PCT International Application No. PCT/US2020/026861, filed on Apr. 6, 2020, which itself claims the benefit of U.S. Provisional Patent Application Ser. No. 62/831,908, filed Apr. 10, 2019, the disclosures of both of which are herein incorporated in their entireties by reference.

FIELD

Various embodiments described herein relate to antenna systems.

BACKGROUND

With the increased demand for Broadband Wireless Access (BWA) networks, there is a significant interest in sharing the same radio spectrum for BWA and Mobile Satellite Service (MSS). MSS operators may use C-band frequencies to connect to non-directional earth station antennas for mobile telecommunications and/or maritime and other transport-related services. Geosynchronous Earth Orbit (GEO), Medium Earth Orbit (MEO), and/or Low Earth Orbit (LEO) MSS satellites may serve a particular geographic area and thus may be a long distance from BWA base stations in other geographic areas. However, the BWA base stations in other geographic areas may send transmissions with sufficient power and/or direction to interfere with signals transmitted from and/or received by an MSS satellite. Interference from terrestrial base station BWA transmitters to the MSS ground receivers and/or MSS satellite receivers is thus of concern.

SUMMARY

Various embodiments of the inventive concept are directed to a method of mitigating interference at a receiver. The method includes receiving a communication signal at a first Circular Polarization (CP) antenna as a first received signal, receiving the communication signal at a second CP antenna as a second received signal, phase shifting the second received signal that was received by the second CP antenna to produce a phase shifted signal, and mixing the first received signal that was received by the first CP antenna and the phase shifted signal to produce a resulting received CP signal.

According to some embodiments, phase shifting the second signal may include inverting the second signal to produce an inverted signal. The inverted signal may be 180° out of phase with the first received signal and/or the second received signal. In some embodiments, the phase shifting the second signal may include performing adaptive filtering on the second received signal based on a feedback loop that compensates for a phase shift and/or a time shift. The communication signal received at the first CP antenna and the second CP antenna may include a satellite communication signal. The communication signal received at the first CP antenna and the second CP antenna may include a satellite communication signal and interference from a terrestrial Broadband Wireless Access (BWA) base station. The first received signal that was received by with the first CP antenna may have a first polarization that is Right Hand Circular Polarization (RHCP) or Left Hand Circular Polarization (LHCP). The second received signal that was received by the second CP antenna may have a second polarization that is the RHCP or the LHCP. The second polarization may be different from the first polarization.

According to some embodiments, the resulting received CP signal includes the communication signal from which the interference from a terrestrial Broadband Wireless Access (BWA) base station has been removed. The mixer may be configured to cancel equal but opposite common mode signals. The method may include receiving the communication signal at a third CP antenna as a third received signal, comparing a first error rate of the third received signal that was received by the third CP antenna with a second error rate of the resulting received CP signal, and selecting one of the resulting received CP signal or the third received signal as an output of the receiver, based on the comparing the first error rate with the second error rate. The first error rate may include a first preamble error rate of a preamble or a first training error rate of a training sequence received by the receiver, and the second error rate may include a second preamble error rate of the preamble associated with the resulting received CP signal or a second training error rate of the training sequence associated with the resulting received CP signal. The resulting received CP signal may include a polarized signal for which the interference has been canceled.

Various embodiments of the present inventive concepts are directed to a wireless electronic device for mitigating interference at a receiver. The wireless electronic device includes a first Circular Polarization (CP) antenna configured to receive a communication signal to produce a first received signal, a second CP antenna configured to receive the communication signal to produce a second received signal, a phase shift circuit configured to phase shift the second received signal to produce a phase shifted signal, and a mixer configure to mix the first received signal and the phase shifted signal to produce a resulting received CP signal.

According to some embodiments, the phase shift circuit may be configured to invert the second signal to produce an inverted signal. The inverted signal may be 180° out of phase with the first received signal and/or the second received signal. The phase shift circuit may be configured to perform adaptive filtering on the second received signal based on a feedback loop that compensates for a phase shift and/or a time shift. The communication signal received at the first CP antenna and the second CP antenna may include a satellite communication signal. The communication signal received at the first CP antenna and the second CP antenna may include a satellite communication signal and interference from a terrestrial Broadband Wireless Access (BWA) base station. The first received signal that was received by the first CP antenna may have a first polarization that is Right Hand Circular Polarization (RHCP) or Left Hand Circular Polarization (LHCP), and the second received signal that was received by the second CP antenna may have a second polarization that is the RHCP or the LHCP. The second polarization may be different from the first polarization.

According to some embodiments, the resulting received CP signal includes the communication signal from which the interference at the receiver from a terrestrial Broadband Wireless Access (BWA) base station has been removed. The mixer may be configured to cancel equal but opposite common mode signals. A third CP antenna may be configured to receive the communication signal to produce a third received signal. A comparator circuit may be configured to compare a first error rate of the third received signal that was received by the third CP antenna with a second error rate of the resulting received CP signal. A selection circuit may be configured to select one of the resulting received CP signal or the third received signal as an output of the receiver, based on the comparator circuit.

According to some embodiments, the first error rate may include a first preamble error rate of a preamble or a first training error rate of a training sequence received by the receiver. The second error rate may include a second preamble error rate of the preamble associated with the resulting received CP signal or a second training error rate of the training sequence associated with the resulting received CP signal. The resulting received CP signal may include a polarized signal for which the interference has been canceled.

Various embodiments of the present inventive concepts are directed to a method of mitigating interference from a terrestrial Broadband Wireless Access (BWA) base station at a receiver of a Mobile Satellite Service (MSS) satellite system. The method may include receiving a satellite communication signal from the MSS satellite and the interference from the terrestrial BWA base station at a first Circular Polarization (CP) antenna as a first received signal, receiving the satellite communication signal and the interference from the terrestrial BWA base station at a second CP antenna as a second received signal, inverting the second received signal and the interference that were received by the second CP antenna to produce an inverted signal, and mixing the first received signal that was received by the first CP antenna and the inverted signal to produce a resulting received CP signal with mitigated interference from the terrestrial BWA base station.

It is noted that aspects of the inventive concepts described with respect to one embodiment, may be incorporated in a different embodiment although not specifically described relative thereto. That is, all embodiments and/or features of any embodiment can be combined in any way and/or combination. Other operations according to any of the embodiments described herein may also be performed. These and other aspects of the inventive concepts are described in detail in the specification set forth below.

BRIEF DESCRIPTION OF THE DRAWINGS

The accompanying drawings, which are included to provide a further understanding of the present disclosure and are incorporated in and constitute a part of this application, illustrate example embodiment(s). In the drawings.

DETAILED DESCRIPTION

Example embodiments of the present inventive concepts now will be described with reference to the accompanying drawings. The present inventive concepts may, however, be embodied in a variety of different forms and should not be construed as limited to the embodiments set forth herein. Rather, these embodiments are provided so that this disclosure will be thorough and complete, and will fully convey the scope of the present inventive concepts to those skilled in the art. In the drawings, like designations refer to like elements.

Satellite downlink transmission of various applications such as broadcast television may occur in the C-band (3.7 GHz to 4.2 GHz) from MSS satellites and/or Fixed Satellite Service (FSS) satellites while uplink transmission may be between 5.925 to 6.425 GHz. A terrestrial MSS receiver or FSS receiver may receive signals from various channels transmitted by the C-band transponders. Although the example embodiments provided herein are discussed in the context of C-band MSS receivers and/or FSS receivers, the techniques described herein may apply to any frequency bands used by MSS/FSS satellites and/or MSS/FSS terrestrial stations, such as Ku-band satellites and/or receivers. A satellite may be at a distance of more than 22,000 miles from a MSS receiver. Due to the distance traveled by the signals from the C-band satellite transponders, the signal strength may be relatively weak and thus may be susceptible to interference from terrestrial communication networks such as Broadband Wireless Access (BWA) networks. Base stations (BS) and User Equipments (UE) of BWA networks may be in close proximity (i.e., within a few miles) to the terrestrial MSS receivers. Various embodiments described herein arise from the recognition that terrestrial co-channel use of satellite frequencies by BWA networks may interfere with the satellite signals received at the terrestrial receive station of the satellite communication system. Interference reduction techniques are described herein to reduce interference to MSS receivers. Although these interference mitigation techniques are described in the context of a terrestrial MSS receiver, similar concepts may be applied satellite MSS receivers, terrestrial FSS receivers, and/or satellite FSS receivers.

Specifically, circular polarization antennas may be used to take advantage of 30 dB isolation between opposite sense antennas. Circular polarization antennas are responsive to linear polarized signals (horizontal/vertical) and experience a 3 dB reduction in captured energy vs. a proper linear polarization receive antenna. In a situation where co-channel (or adjacent channel) band usage is accomplished by using linear polarized signals (i.e., to or from a satellite, for example), the linear polarized signal received by the circular polarization antenna may be mitigated or minimized by the use of an opposite sense circular polarization antenna and a 180° phase inverter. The opposite sense antenna signal that has been phase inverted may cancel the common mode linear signal seen by both of the Right Hand Circular Polarized (RHCP) and Left Hand Circular Polarized (LHCP) antennas. The RHCP and LHCP antennas may be co-located in the feed assembly in order to assure as close to a common (i.e., in phase) signal relationship as possible. For example, assuming a RHCP signal is desired, the RHCP antennas will be receiving a combination of the desired RHCP signal plus the linear polarized signals seen at the antenna. The LHCP antenna would receive the RHCP signal 30 dB down, and see the linear polarized signals equal in strength to the RHCP antenna. If the signal from the LHCP antenna is shifted 180° out of phase and mixed with the RHCP signal, the common signal (the linear polarized contribution) may be canceled, leaving the desired RHCP carrier that is 30 dB stronger.

Figure 1:
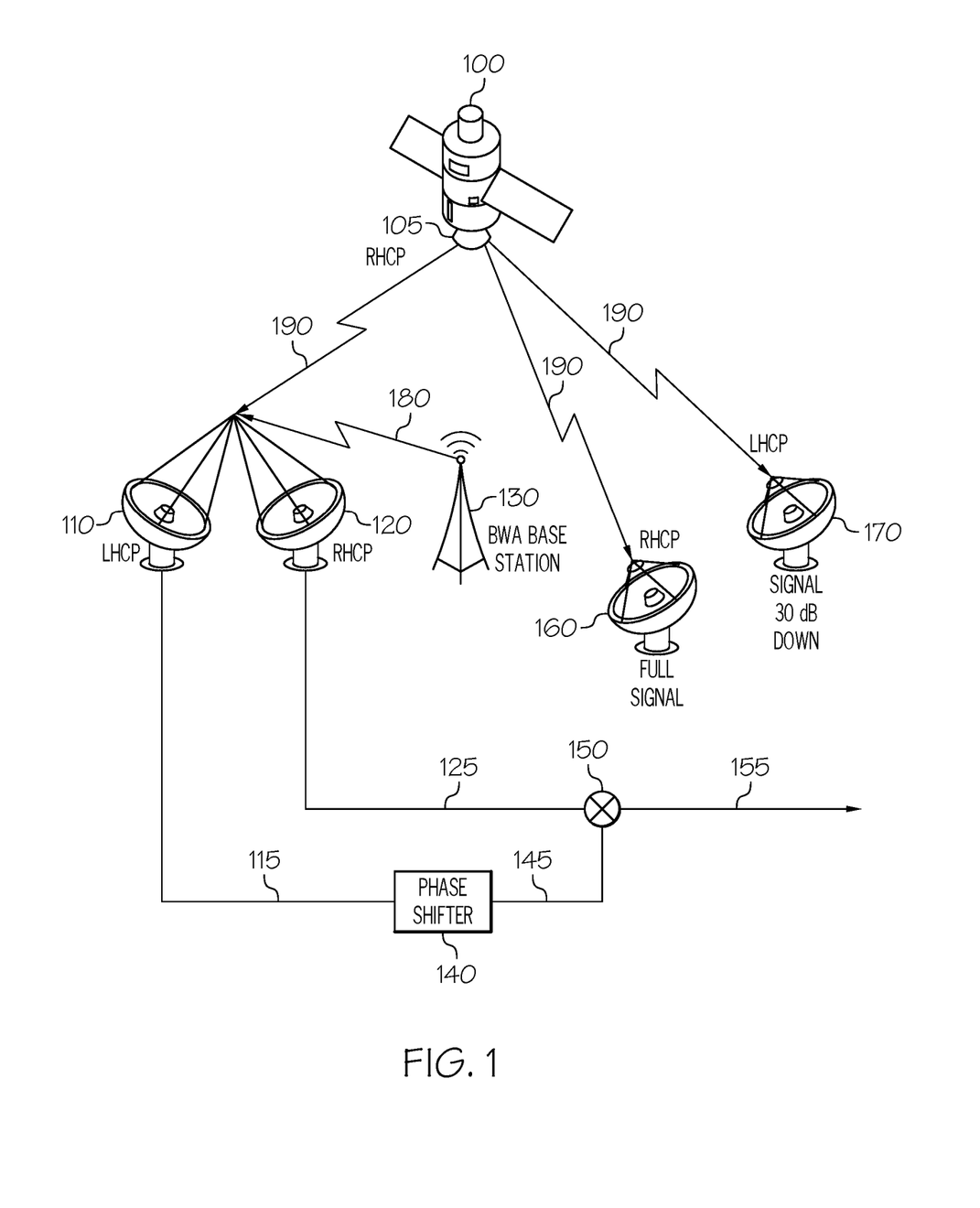
FIG. 1 illustrates a satellite communication system with interference from a terrestrial BWA base station, according to various embodiments described herein.

FIG. 1 illustrates a satellite communication system with interference from a terrestrial BWA base station. A communication signal 190 may be transmitted from a RHCP antenna 105 at a satellite 100. A RHCP receiver antenna 160 may receive the full signal whereas a LHCP antenna 170 may receive this communication signal 190 at approximately 30 dB lower signal strength. A terrestrial satellite receiver may receive the communication signal 190 and noise or interference 180 from a BWA base station 130 that is reusing satellite frequencies for terrestrial use. According to various embodiments described herein, a receiver may include a RHCP antenna 120 and a LHCP antenna 110 that receive the communication signal 190 and the interference 180. A signal 115 that was received at the LHCP antenna 110 is subjected to a phase shift circuit 140 to produce a phase shifted signal 145. The phase shifted signal 145 is mixed with received signal 125 that was received at the RHCP antenna 120 by a mixer 150. The resulting received circular polarization signal 155 has significantly mitigated interference.

Figure 2:
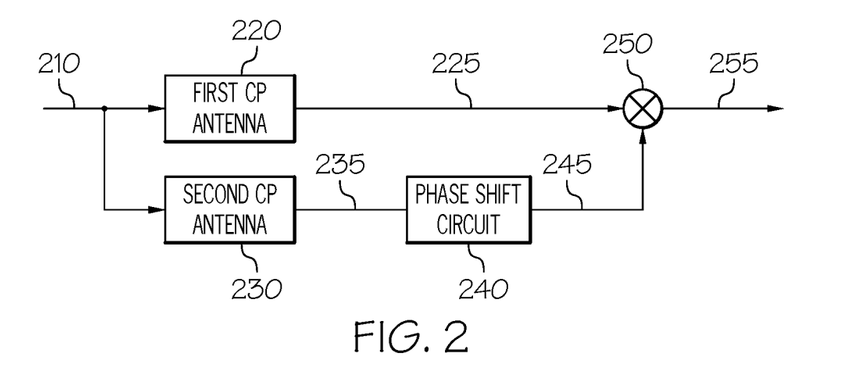
FIGS. 2 to 6 illustrate interference mitigation techniques using circular polarization antennas, according to various embodiments described herein.

FIGS. 2 to 6 illustrate interference mitigation techniques using the circular polarization antennas of FIG. 1 at the receiver. Referring now to FIG. 2, a linear polarized signal from a satellite transmitter and interference from a BWA base station are input to the receiver circuit at 210. The receiver includes a first circular polarization antenna 220 and a second circular polarization antenna 230. The signal 235 received at the second circular polarization antenna 230 is phase shifted by a phase shift circuit 240 to produce a phase shifted signal 245. The phase shift circuit 240 may include an amplifier circuit to perform operations on the signal 235 received at the second circular polarization antenna 230 for alignment in time, phase, and/or amplitude to the signal 225 received by the first circular polarization antenna 220. The phase shifted signal 245 and the signal 225 received by the first circular polarization antenna 220 are input to a mixer 250 to produce a resulting received circular polarization signal 255. The mixer 250 is configured to cancel equal but opposite common mode signals such as the interference from the BWA base station.

Figure 3:
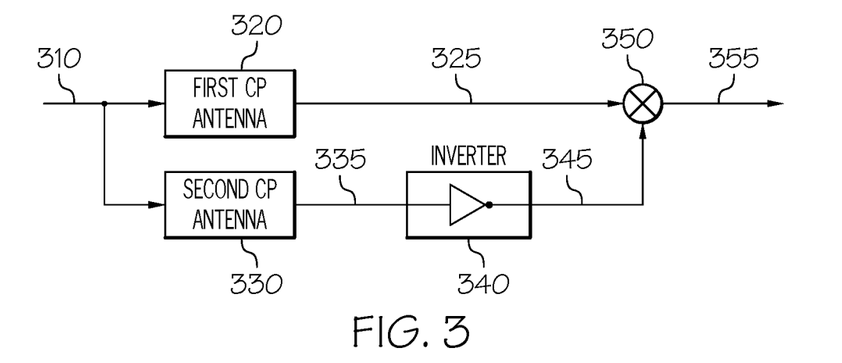

Referring now to FIG. 3, a linear polarization signal from a satellite transmitter and interference from a BWA base station are input to the receiver circuit at 310. The receiver includes a first circular polarization antenna 320 and a second circular polarization antenna 330. The signal 335 received at the second circular polarization antenna 330 is inverted by an inverter circuit 340 to produce an inverted signal 345 that is phase shifted by 180°. The inverted signal 345 and the signal 325 received by the first circular polarization antenna are input to a mixer 350 to produce a resulting received circular polarization signal 355. The mixer 350 is thus configured to cancel the interference from the BWA base station.

Figure 4:
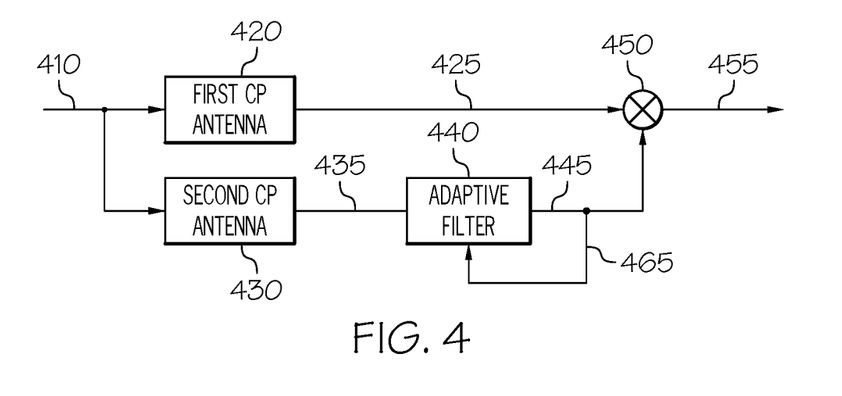

Referring now to FIG. 4, a linear polarization signal from a satellite transmitter and interference from a BWA base station are input to the receiver circuit at 410. The receiver includes a first circular polarization antenna 420 and a second circular polarization antenna 430. The signal 445 received at the second circular polarization antenna 430 is processed by an adaptive filter 440 to produce a phase shifted signal 445 that is phase shifted by 180°. The adaptive filter 440 may use a feedback loop 465 to compensate for phase shifts and/or time shifts. The adaptive filter 440 may use a least squares approach, such as a Weiner filter, to change least squares coefficients based on the feedback loop 465. The processed signal 445 and the signal 425 received by the first circular polarization antenna 420 are input to a mixer 450 to produce a resulting received circular polarization signal 455. The mixer 450 is thus configured to cancel the interference from the BWA base station.

Figure 5:
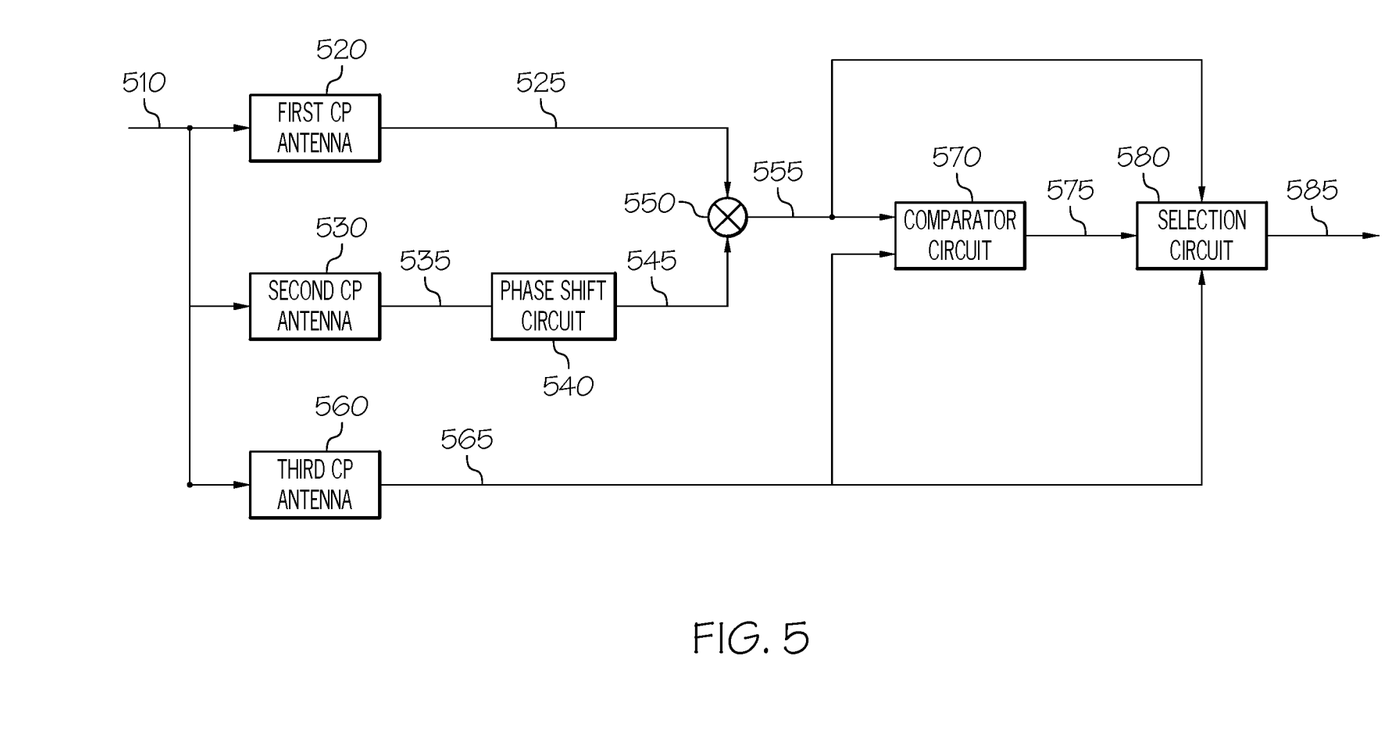

According to some embodiments, the receiver may compare performance between a receive antenna system with and without using a phase shifted version of the interference to cancel interference from a BWA base station. Referring now to FIG. 5, a linear polarized signal from a satellite transmitter and interference from a BWA base station are input to the receiver circuit at 510. The receiver includes a first circular polarization antenna 520 and a second circular polarization antenna 530. The signal 535 received at the second circular polarization antenna 530 is phase shifted by a phase shift circuit 540 to produce a phase shifted signal 545. The phase shifted signal 545 and the signal 525 received by the first circular polarization antenna 520 are input to a mixer 550 to produce a resulting received circular polarization signal 555. In some embodiments, the signal 525 received by the first circular polarization antenna 520 may be amplified before the operations of the mixer 550 are performed. The mixer 550 is configured to cancel equal but opposite common mode signals such as the interference from the BWA base station. A third circular polarization antenna 560 has a third received signal 565. The third received signal 565 and the resulting received circular polarization signal 555 are input to a comparator circuit 570. The comparator circuit 570 may compare the respective performances of the third received signal 565 and the resulting received circular polarization signal 555 by comparing parameters such as error rate, noise floor power, etc. Error rate may be checked on the preamble, on a training sequence that may be sent from the satellite transmitter, or other periodic sequences. In some embodiments, performance measurements may take advantage of a gap in transmission, blanking interval, or unused spectrum located between carriers in the satellite downlink transmissions by transmitting a training sequence or other known sequence to facilitate comparing the third circular polarization antenna 560 performance with the resulting received circular polarization signal 555 of the mixer 550. The comparator 570 may provide a selection signal 575 based on the comparison to a selection circuit 580 that selects between the resulting received circular polarization signal 555 that is output from the mixer 550 and the third received signal 565 from the third circular polarization antenna 560. The selected signal 585 is the output of the receiver, according to various embodiments described herein.

Figure 6:
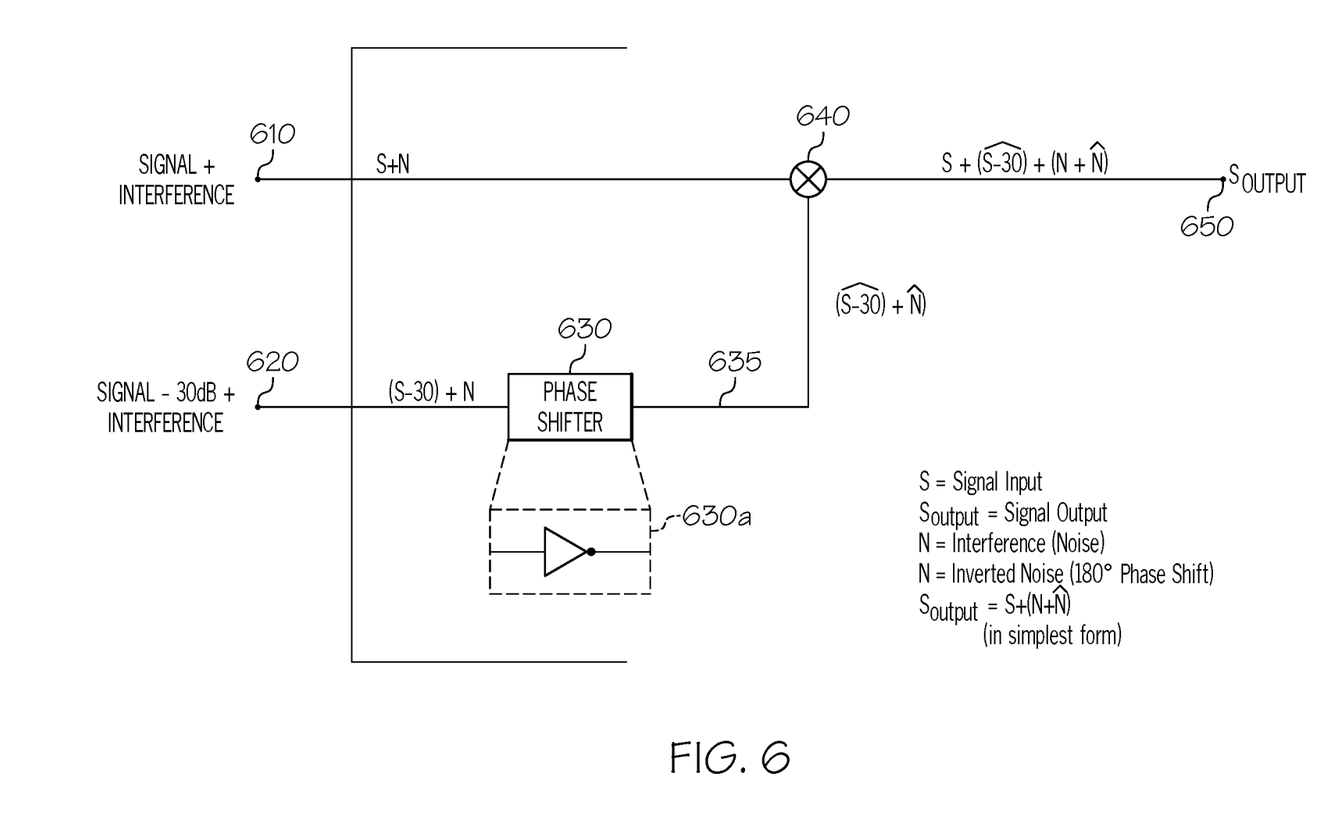

FIG. 6 illustrates the interference cancellation that occurs according to various embodiments described herein, such as embodiments described with respect to FIGS. 1 to 5. Referring to FIG. 6, a signal from the satellite 100 and interference from the BWA base station 130 of FIG. 1 arrive at the input to the receiver at a first circular polarization antenna having a first polarity, such as, for example, RHCP. The signal from the satellite 100 arrives at a second circular polarization antenna 620 having a second polarity that is opposite the first polarity, such as, for example, LHCP at approximately 30 dB less in signal strength than the signal at the first circular polarization antenna 610. The second circular polarization antenna 620 receives similar interference, N, as the interference received by the first circular polarization antenna 610. Thus, the signals at the output of the first circular polarization antenna 610 may be denoted as (S+N) and the signals at the output of the second circular polarization antenna 620 may be denoted as ((S−30)+N). A phase shift circuit 630 may shift the phase. In some embodiments, the phase shift circuit 630 may include an inverter 630a that inverts the signal such that it is 180° out of phase with the input of the phase shift circuit 630. The phase shift circuit 630 may provide amplification of the signal before sending it to a mixer 640. The phase shifted signal 635 may be denoted as $(\overline{S-30})+\hat{N}$ and input to the mixer 640 along with the output of the first circular polarization antenna 610. The signal output 650 of the mixer 640 may be denoted as $(S+(\overline{S-30})+(N+\hat{N})$. The interference from a BWA base station is thus substantially canceled or mitigated, as indicated by the term $(N+\hat{N})$.

Figure 7:
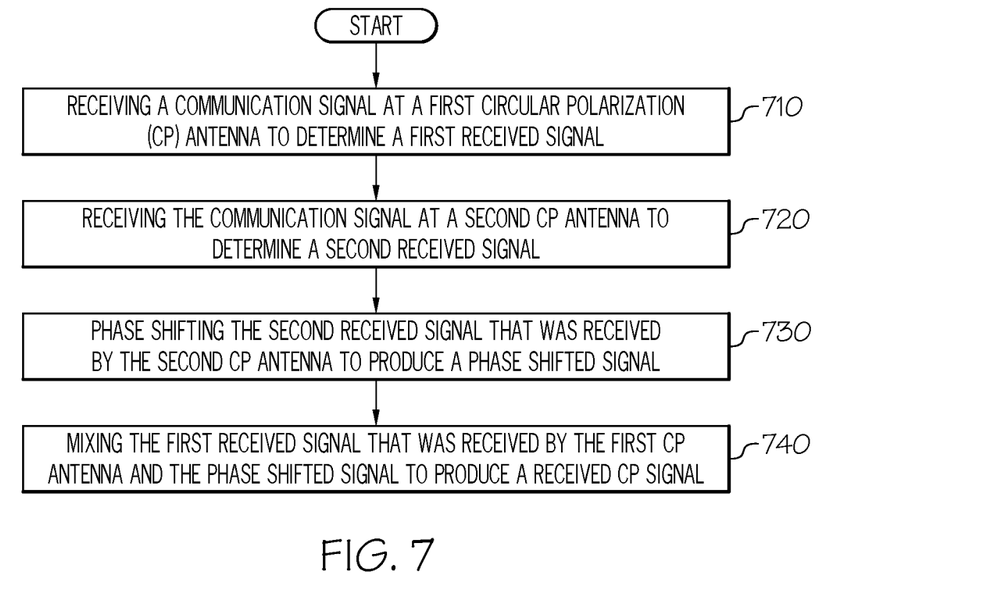
FIGS. 7 to 10 are flowcharts illustrating operations for reducing interference to a receiver, according to various embodiments of the present inventive concepts.

FIGS. 7 to 10 are flowcharts of operations for reducing interference to a receiver, according to various embodiments described herein. FIG. 7 is directed to operations of a method of mitigating interference at a receiver. Referring to FIG. 7, a communication signal may be received at a first Circular Polarization (CP) antenna to determine a first received signal, at block 710. The communication signal may be received at a second CP antenna to determine a second received signal, at block 720. The communication signal received at the first circular polarization antenna and the second circular polarization antenna may include a satellite communication signal. In some embodiments, the communication signal received at the first circular polarization antenna and the second circular polarization antenna may include a satellite communication signal and interference from a terrestrial Broadband Wireless Access (BWA) base station. The first received signal that was received by the first circular polarization antenna has a first polarization that is RHCP or LHCP. The second received signal that was received by the second circular polarization antenna has a second polarization that is the RHCP or the LHCP. The second polarization has a different polarization from the first polarization.

Still referring to FIG. 7, the second received signal that was received by the second circular polarization antenna may be phase shifted to produce a phase shifted signal, at block 730. The first received signal that was received by the first circular polarization antenna and the phase shifted signal may be input to a mixer to produce a resulting received circular polarization signal, at block 740. The mixer may add or combine the input signals together to mitigate, reduce, or cancel noise or interference from a BWA base station. The mixer may configured to cancel equal but opposite common mode signals. The resulting received circular polarization signal that is output from the mixer includes the communication signal from which the interference from a terrestrial BWA base station has been removed.

Figure 8:
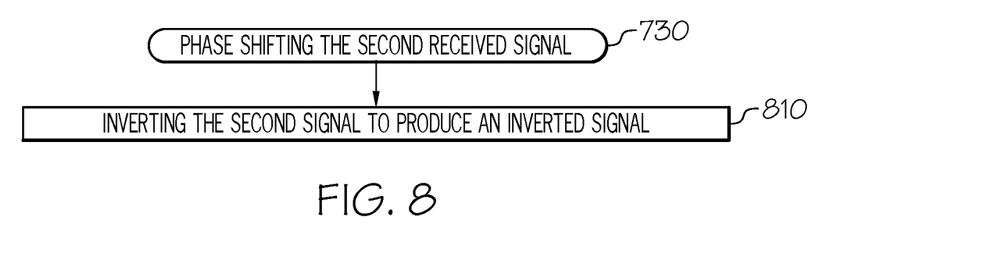

Referring to FIG. 8, phase shifting the second signal of block 730 of FIG. 7 may include inverting the second signal to produce an inverted signal, at block 810. Inverting the signal received by the second circular polarization antenna may produce an inverted signal that is 180° out of phase with the signal received by the second circular polarization antenna.

Figure 9:
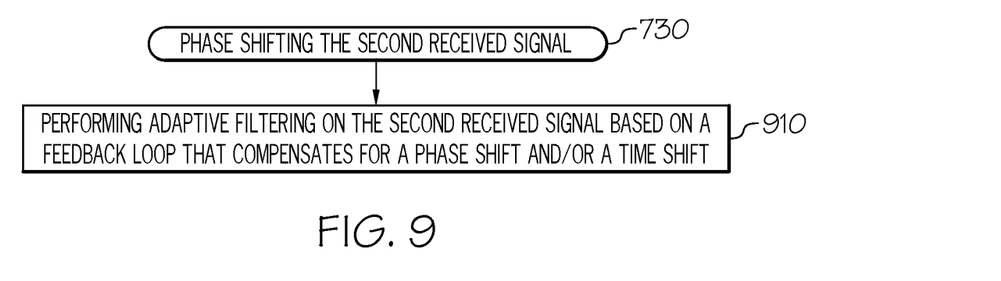

Referring to FIG. 9, phase shifting the second signal of block 730 of FIG. 7 may include performing adaptive filtering on the second received signal based on a feedback loop that compensates for a phase shift and/or a time shift, at block 910. The adaptive filtering may use a feedback loop to compensate for phase shifts and/or time shifts. The adaptive filter may use a least squares approach, such as a Weiner filter, to change least squares coefficients based on the feedback loop. Adaptive filtering the signal received by the second circular polarization antenna may produce an inverted signal that is 180° out of phase with the signal received by the second circular polarization antenna.

Figure 10:
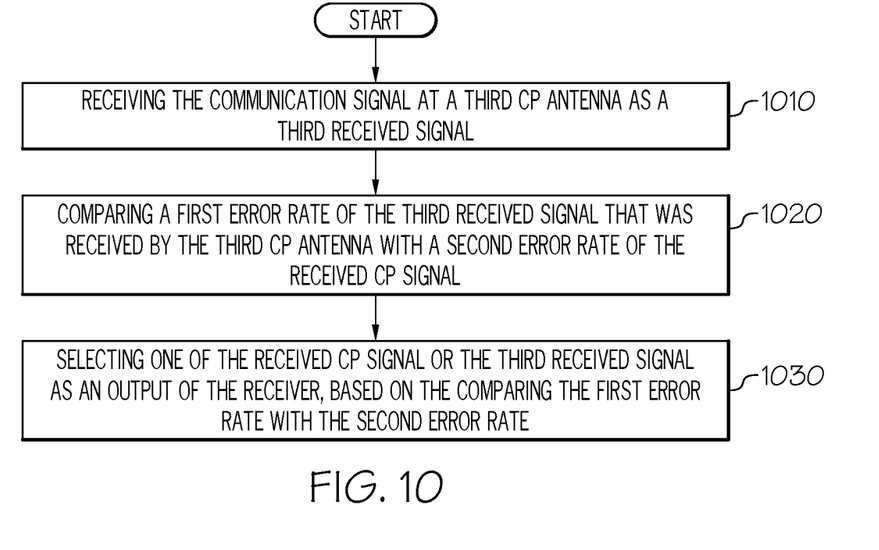

According to some embodiments, the receiver may compare performance between a receive antenna system with and without using a phase shifted version of the interference to cancel interference from a BWA base station. Referring to FIG. 10, the communication signal may be received at a third circular polarization antenna to determine a third received signal, at block 1010. A first error rate of the third received signal that was received by the third CP antenna may be compared with a second error rate of the resulting received circular polarization signal, at block 1020. One of the resulting received circular polarization signal or the third received signal may be selected as an output of the receiver, based on the comparing the first error rate with the second error rate, at block 1030. The first error rate may include a first preamble error rate of a preamble or a first training error rate of a training sequence received by the receiver. The second error rate may include a second preamble error rate of the preamble associated with the resulting received circular polarization signal or a second training error rate of the training sequence associated with the resulting received circular polarization signal.

Figure 11:
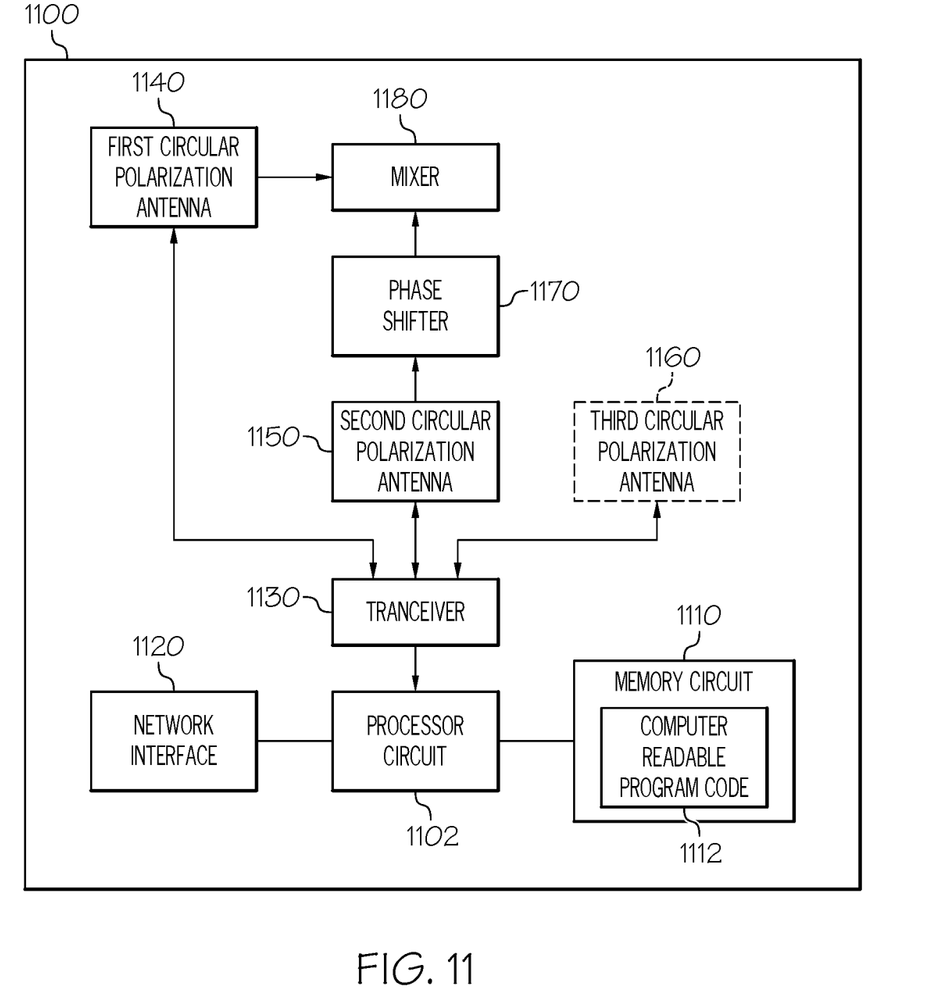
FIG. 11 is a block diagram of a wireless electronic device, according to various embodiments described herein.

FIG. 11 is a block diagram of a wireless electronic device 1100 for mitigating interference at a receiver, such as discussed with respect to embodiments associated with FIGS. 1 to 6. The wireless electronic device 1100 may be integrated with a terrestrial receiver and/or a satellite receiver of a satellite communication system and is configured to perform operations according to one or more embodiments described herein. Referring to FIG. 11, the wireless electronic device 1100 includes a processor circuit 1102, and a memory circuit 1110 containing computer readable program code 1112. The processor circuit 1102 may include one or more data processing circuits, such as a general purpose and/or special purpose processor, e.g., microprocessor and/or digital signal processor, which may be collocated or distributed across one or more networks. The processor circuit 1102 is configured to execute the computer readable program code 1112 in the memory 1110 to perform at least some of the operations and methods of described herein as being performed by the wireless electronic device 1100. A network interface 1120 is coupled to the processor circuit 1102 and may communicate with a server or other external network entity, directly or indirectly.

Still referring to FIG. 11, a transceiver 1130 may transmit and/or receive signals from the first circular polarization antenna 1140, the second circular polarization antenna 1150, and/or the third circular polarization antenna 1160. Signals received by the second circular polarization antenna 1150 may be input into a phase shifter 1170, such as, for example, the inverter circuit 340 of FIG. 3 or the adaptive filter 440 of FIG. 4. The phase shifted signal from the phase shifter 1170 may be provided to a mixer 1180 to be combined with signals from the first circular polarization antenna 1140.

FURTHER EMBODIMENTS

In the above-description of various embodiments of the present disclosure, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art, and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that, although the terms first, second, third, etc. may be used herein to describe various elements, and elements should not be limited by these terms; rather, these terms are only used to distinguish one element from another element. Thus, a first element discussed could be termed a second element without departing from the scope of the present inventive concepts.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/Blu-ray).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of the present disclosure may be embodied in hardware and/or in software (including firmware, resident software, microcode, etc.) that runs on a processor such as a digital signal processor, which may collectively be referred to as "circuitry," "a module" or variants thereof.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The flowcharts and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various example combinations and subcombinations of embodiments and of the manner and process of making and using them, and shall support claims to any such combination or subcombination. Many variations and modifications can be made to the embodiments without substantially departing from the principles described herein. All such variations and modifications are intended to be included herein within the scope.

The invention claimed is:

1. A method of mitigating interference at a receiver, the method comprising:
   receiving a communication signal at a first Circular Polarization (CP) antenna as a first received signal;
   receiving the communication signal at a second CP antenna as a second received signal;
   phase shifting the second received signal that was received by the second CP antenna to produce a phase shifted signal; and
   mixing the first received signal that was received by the first CP antenna and the phase shifted signal to produce a resulting received CP signal,
   wherein the communication signal received at both the first CP antenna and the second CP antenna comprises a satellite communication signal and co-channel interference from a terrestrial Broadband Wireless Access (BWA) base station, and
   wherein the phase shifting the second received signal comprises inverting the second received signal that was received by the second CP antenna to produce an inverted signal that is 180° out of phase with the first received signal that was received by the first CP antenna and/or the second received signal.

2. The method of claim 1, wherein the phase shifting the second received signal comprises:
   performing adaptive filtering on the second received signal based on a feedback loop that compensates for a phase shift and/or a time shift.

3. The method of claim 1,
   wherein the communication signal received at the first CP antenna and the second CP antenna comprises a satellite communication signal.

4. The method of claim 1,
   wherein the mixing removes the co-channel interference from the communication signal, and
   wherein the resulting received CP signal comprises the communication signal from which the co-channel interference from the terrestrial BWA base station has been removed.

5. The method of claim 1,
   wherein the first received signal that was received by the first CP antenna has a first polarization comprising Right Hand Circular Polarization (RHCP) or Left Hand Circular Polarization (LHCP),
   wherein the second received signal that was received by the second CP antenna has a second polarization comprising the RHCP or the LHCP, and
   wherein the second polarization is different from the first polarization.

6. The method of claim 1,
   wherein the mixing comprises canceling equal but opposite common mode signals.

7. The method of claim 1,
   wherein the resulting received CP signal comprises a polarized signal for which the co-channel interference has been canceled.

8. A method of mitigating interference at a receiver, the method comprising:
   receiving a communication signal at a first Circular Polarization (CP) antenna as a first received signal;
   receiving the communication signal at a second CP antenna as a second received signal;
   phase shifting the second received signal that was received by the second CP antenna to produce a phase shifted signal; and
   mixing the first received signal that was received by the first CP antenna and the phase shifted signal to produce a resulting received CP signal,
   receiving the communication signal at a third CP antenna as a third received signal;
   comparing a first error rate of the third received signal that was received by the third CP antenna with a second error rate of the resulting received CP signal; and
   selecting one of the resulting received CP signal or the third received signal as an output of the receiver, based on the comparing the first error rate with the second error rate,
   wherein the communication signal received at the first CP antenna and the second CP antenna comprises a satellite communication signal and co-channel interference from a terrestrial Broadband Wireless Access (BWA) base station.

9. The method of claim 8,
   wherein the first error rate comprises a first preamble error rate of a preamble in the communication signal or a first training error rate of a training sequence in the communication signal received by the receiver, and
   wherein the second error rate comprises a second preamble error rate of a preamble associated with the resulting received CP signal or a second training error rate of a training sequence associated with the resulting received CP signal.

10. A wireless electronic device for mitigating interference at a receiver, the wireless electronic device comprising:
- a first Circular Polarization (CP) antenna configured to receive a communication signal to produce a first received signal;
- a second CP antenna configured to receive the communication signal to produce a second received signal;
- a phase shift circuit configured to phase shift the second received signal to produce a phase shifted signal; and
- a mixer configure to mix the first received signal and the phase shifted signal to produce a resulting received CP signal,
- wherein the communication signal received at both the first CP antenna and the second CP antenna comprises a satellite communication signal and co-channel interference from a terrestrial Broadband Wireless Access (BWA) base station, and
- wherein the phase shift circuit is configured to produce the phase shifted signal by inverting the second received signal that was received by the second CP antenna to produce an inverted signal that is 180° out of phase with the first received signal that was received by the first CP antenna and/or the second received signal.

11. The wireless electronic device of claim 10,
wherein the phase shift circuit is configured to perform adaptive filtering on the second received signal based on a feedback loop that compensates for a phase shift and/or a time shift.

12. The wireless electronic device of claim 10,
wherein the communication signal received at the first CP antenna and the second CP antenna comprises a satellite communication signal.

13. The wireless electronic device of claim 10,
wherein the first received signal that was received by the first CP antenna has a first polarization comprising Right Hand Circular Polarization (RHCP) or Left Hand Circular Polarization (LHCP),
wherein the second received signal that was received by the second CP antenna has a second polarization comprising the RHCP or the LHCP, and
wherein the second polarization is different from the first polarization.

14. The wireless electronic device of claim 10,
wherein the mixer is configured to remove the co-channel interference from the communication signal, and
wherein the resulting received CP signal comprises the communication signal from which the co-channel interference from the terrestrial BWA base station has been removed.

15. The wireless electronic device of claim 10,
wherein the mixer is configured to cancel equal but opposite common mode signals.

16. The wireless electronic device of claim 10, further comprising:
- a third CP antenna configured to receive the communication signal to produce a third received signal;
- a comparator circuit configured to compare a first error rate of the third received signal that was received by the third CP antenna with a second error rate of the resulting received CP signal; and
- a selection circuit configured to select one of the resulting received CP signal or the third received signal as an output of the receiver, based on the comparator circuit.

17. The wireless electronic device of claim 16,
wherein the first error rate comprises a first preamble error rate of a preamble in the communication signal or a first training error rate of a training sequence in the communication signal received by the receiver, and
wherein the second error rate comprises a second preamble error rate of a preamble associated with the resulting received CP signal or a second training error rate of a training sequence associated with the resulting received CP signal.

18. The wireless electronic device of claim 10,
wherein the resulting received CP signal comprises a polarized signal for which the co-channel interference has been canceled.

19. A method of mitigating interference from a terrestrial Broadband Wireless Access (BWA) base station at a receiver of a Mobile Satellite Service (MSS) satellite system, the method comprising:
- receiving a satellite communication signal from the MSS satellite system and the interference from the terrestrial BWA base station at a first Circular Polarization (CP) antenna as a first received signal;
- receiving the satellite communication signal and the interference from the terrestrial BWA base station at a second CP antenna as a second received signal;
- inverting the second received signal and the interference that were received by the second CP antenna to produce an inverted signal that is 180° out of phase with the first received signal that was received by the first CP antenna; and
- mixing the first received signal that was received by the first CP antenna and the inverted signal to produce a resulting received CP signal with mitigated interference from the terrestrial BWA base station.

* * * * *